(12) United States Patent
Prince et al.

(10) Patent No.: US 10,118,128 B2
(45) Date of Patent: Nov. 6, 2018

(54) VACUUM AIR GAP MEMBRANE DISTILLATION SYSTEM AND METHOD FOR DESALINATION

(75) Inventors: James Antony Prince, Singapore (SG); Gurdev Singh, Singapore (SG); Tiruvannamalai Subbarayan Shanmugasundaram, Singapore (SG)

(73) Assignee: Ngee Ann Polytechnic, Singapore (SG)

( * ) Notice: Subject to any disclaimer, the term of this patent is extended or adjusted under 35 U.S.C. 154(b) by 1052 days.

(21) Appl. No.: 14/390,297

(22) PCT Filed: Apr. 2, 2012

(86) PCT No.: PCT/SG2012/000115
§ 371 (c)(1),
(2), (4) Date: Dec. 15, 2014

(87) PCT Pub. No.: WO2013/151498
PCT Pub. Date: Oct. 10, 2013

(65) Prior Publication Data
US 2015/0114818 A1    Apr. 30, 2015

(51) Int. Cl.
*B01D 61/36* (2006.01)
*C02F 1/44* (2006.01)
(Continued)

(52) U.S. Cl.
CPC ........... *B01D 61/364* (2013.01); *B01D 5/006* (2013.01); *B01D 5/0072* (2013.01);
(Continued)

(58) Field of Classification Search
CPC ............ B01D 2311/26; B01D 2313/24; B01D 2325/36; B01D 5/006; B01D 5/0072;
(Continued)

(56) References Cited

U.S. PATENT DOCUMENTS

| 3,563,860 A | * | 2/1971 | Henderyckx | ........ B01D 61/362 |
| | | | | 159/27.1 |
| 4,460,473 A | | 7/1984 | Curtin | |

(Continued)

FOREIGN PATENT DOCUMENTS

| CN | 101417209 A | 4/2009 |
| CN | 101564649 A | 10/2009 |

(Continued)

OTHER PUBLICATIONS

International Preliminary Report on Patentability for International Application No. PCT/SG2012/000115, International Filing Date Apr. 2, 2012, Report Completed Oct. 7, 2014, 5 pages.

(Continued)

*Primary Examiner* — Renee Robinson
*Assistant Examiner* — Derek N Mueller
(74) *Attorney, Agent, or Firm* — Klein, O'Neill & Singh, LLP

(57) ABSTRACT

This invention relates to a vacuum air gap membrane distillation system for desalination purposes. More particularly, this invention relates to a membrane distillation system with multiple cells in which the system's flux is increased due to the temperature and pressure differential within the system. The configuration of the vacuum air gap membrane distillation system allows for latent heat within the system to be recycled effectively reducing the energy consumption of the system.

29 Claims, 12 Drawing Sheets

(51) Int. Cl.
*B01D 63/08* (2006.01)
*B01D 5/00* (2006.01)
*B01D 69/02* (2006.01)
*B01D 69/12* (2006.01)
*C02F 1/04* (2006.01)
*C02F 103/08* (2006.01)

(52) U.S. Cl.
CPC ......... *B01D 61/366* (2013.01); *B01D 63/082* (2013.01); *B01D 69/02* (2013.01); *B01D 69/12* (2013.01); *C02F 1/046* (2013.01); *C02F 1/447* (2013.01); B01D 2311/26 (2013.01); B01D 2313/24 (2013.01); B01D 2325/36 (2013.01); C02F 2103/08 (2013.01); Y02A 20/128 (2018.01); Y02A 20/131 (2018.01); Y02W 10/37 (2015.05)

(58) Field of Classification Search
CPC .. B01D 61/364; B01D 61/366; B01D 63/082; B01D 69/02; B01D 69/12; C02F 1/046; C02F 1/447; C02F 2103/08
See application file for complete search history.

(56) References Cited

U.S. PATENT DOCUMENTS

| | | | |
|---|---|---|---|
| 4,545,862 | A | 10/1985 | Gore et al. |
| 6,716,355 | B1 | 4/2004 | Hanemaaijer |
| 7,638,059 | B2 | 12/2009 | Kim et al. |
| 7,871,520 | B2 | 1/2011 | Ma et al. |
| 8,029,671 | B2 | 10/2011 | Cath |
| 8,029,675 | B2 | 10/2011 | Heinzl |
| 2004/0211726 | A1 | 10/2004 | Baig |
| 2006/0076294 | A1 | 4/2006 | Sirkar |
| 2009/0000939 | A1 | 1/2009 | Heinzl |
| 2010/0051549 | A1 | 3/2010 | Ma et al. |
| 2010/0072135 | A1 | 3/2010 | Hanemaaijer |
| 2010/0089830 | A1 | 4/2010 | Cath |
| 2012/0038069 | A1 | 2/2012 | Heinzl et al. |

FOREIGN PATENT DOCUMENTS

| | | |
|---|---|---|
| CN | 201714609 U | 1/2011 |
| WO | 2009005454 A1 | 1/2009 |
| WO | 2010127819 A1 | 11/2010 |
| WO | 2013074040 A1 | 5/2013 |

OTHER PUBLICATIONS

International Search Report for International Application No. PCT/SG2012/000115, Search Completed Jun. 4, 2012, dated Jun. 4, 2012, 3 pages.

Written Opinion for International Application No. PCT/SG2012/000115, Search Completed Jun. 4, 2012, dated Jun. 4, 2012, 4 pages.

\* cited by examiner

VACUUM AIR GAP MEMBRANE DISTILLATION SYSTEM AND METHOD FOR DESALINATION

FIELD OF THE INVENTION

This invention relates to a vacuum air gap membrane distillation system for desalination. More particularly, this invention relates to a membrane distillation system with multiple cells for a highly efficient desalination process that requires minimal energy consumption.

PRIOR ART

Membrane Distillation (MD) is a thermally driven process, in which only vapour molecules are transported through a membrane layer. A liquid feed for a distilland is located on one side of the membrane and a collection area for the distillate or the collected liquid condensed from the vapour molecules is located on the other side of the membrane. The distilland is typically heated and the distillate is typically at a cooler temperature than the distilland. Evaporation takes place on the heated distilland side of the membrane and condensation occurs on the cooler distillate side of the membrane. As the distilland side has a much higher temperature as compared to the distillate side, the distilland side has a higher vapour pressure than the distillate side. As the membrane separates the distilland from the distillate, a vapour pressure gradient exists between the two sides of the membrane. This vapour pressure gradient is the main driving force that causes evaporated liquid from the distilland side to be transported through the membrane to the distillate area where the vapour then condenses into the desired liquid. Another driving force that assists in the transport of the vapour molecules through a membrane layer is thermal diffusion. Due to the temperature difference between the distilland side and the distillate side, evaporated water molecules diffuse from the side with the higher temperature to the side with the lower temperature.

MD systems are more advantageous compared to reverse osmosis systems and pure distillation systems as MD systems operate at much lower pressures and lower temperatures. MD systems have been around since the late 1960s but have not been widely commercially adopted as a water desalination process partially because of the low flux rate achievable by typical desalination processes. Recently, MD systems are considered as a potentially viable solution for the treatment of sea water because of the intensified research being carried out on various improvements to existing MD systems. Additionally, the latest MD systems now may tap into renewable heating sources such as solar energy or excess heat generated from power plants to heat the distilland resulting in MD systems that are more energy efficient and more cost effective making these systems more viable for commercialization activities. There are presently four general types of membrane distillation systems and these include Air Gap Membrane Distillation (AGMD), Direct Contact Membrane Distillation (DCMD), Sweep Gas Membrane Distillation (SGMD), and Vacuum Membrane Distillation (VMD).

In AGMD systems, an air gap exists between the cold water feed and the distillate side of the membrane while the distilland side of the membrane is in direct contact with the hot water feed. The filtered water vapours diffuse across the air gap before condensing on a cooled metal plate located across the air gap. The condensate then drains out of the air gap cavity by gravity. A disadvantage of AGMD systems is the presence of stagnant air within the air gap cavity. This stagnant air reduces the flux rate of the system as the resistance attributed to the stagnant air reduces the mass transfer rate of the system.

In DCMD systems, the membrane is in direct contact on one side with the cold water feed and in direct contact on the other side with the hot water feed. The evaporated water vapour that is filtered by the membrane condenses and combines with the cooler water at the cold water side of the membrane. DCMD systems are best suited for desalination applications and to reduce the concentration of aqueous solutions. A disadvantage of DCMD systems is that in spite of the poor conductivity of the membrane, heat directly conducts through the membrane from the distilland side to the distillate side. Therefore, only part of the heat supplied to the distilland is used for the evaporation process. The remainder of the heat supplied to the distilland is lost to the distillate as the distillate is in direct contact with the membrane resulting in a system with extremely low thermal efficiency.

SGMD systems typically utilize a gas stream at the distillate side of the membrane as a carrier for the water vapours. The gas stream blowing across the surface of the membrane removes water vapour particles from the surface and/or pores of the membrane into a condensation chamber. The water vapour is condensed within an external condensation chamber and collected for further use. In addition to lowering heat conduction loss, the gas stream also lowers mass transfer resistance. SGMD systems are best suited for applications that require the removal of volatiles from aqueous solutions. The disadvantage of SGMD systems is that a large sweeping gas flow is required to achieve significant permeate yield and that an external condenser is required for the condensation process.

VMD systems typically utilize a vacuum at the distillate side of the membrane to extract the water vapours. The extracted water vapours are condensed in a separate condensation apparatus. Unlike DCMD and AGMD systems which utilize diffusive flux to affect the transfer of water vapour, the larger pressure difference between the distilland side of the membrane and the distillate side of the membrane causes a convective mass flow through the pores of the membrane that contributes to the total mass transfer of the VMD system. The advantages of VMD systems are that the heat conduction loss of the system is negligible due to the low pressure on the distillate side and that the mass flux of a VMD system is typically larger as compared to other MD systems. Similarly, with SGMD systems, VMD systems are best suited for applications that require the removal of volatiles from aqueous solutions. A disadvantage of VMD systems is that an external condenser has to be provided for the condensation of the collected water vapour molecules.

Some proposed methods to increase the flux transfer of DCMD systems include applying vacuum to the permeate side of the membrane in order to cause the permeate stream to flow under vacuum or reduced pressure. Such a method is disclosed in U.S. Pat. No. 8,029,671 B2, published on 4 Oct. 2011, in the name of Board of Regents of the Nevada System of Higher Education, on behalf of the University of Nevada, Reno. This publication discloses a vacuum enhanced direct contact membrane distillation system. In the disclosed system, vacuum is applied to the permeate side to produce a higher flux transfer rate across the distillation membrane. U.S. Publication No. 2010/0089830 published on 15 Apr. 2010 in the name of Tzahi Y. Cath et. al. also discloses a method to increase the flux of a DCMD system by applying a vacuum to the permeate stream. The vapour pressure differential across the membrane then causes the water in the distilland to evaporate, pass through the membrane and condense in the permeate stream. A disadvantage of the vacuum enhanced DCMD systems disclosed within these publications is that the condensation of the water vapour occurs within the permeate solution that is in direct contact with the membrane. Hence, the permeate solution has to be maintained in an uncontaminated state throughout the entire process. Typically, in order to achieve such a state, an external filtration device would be required. Additionally, as the condensate is mixed with the permeate solution; it would be difficult to detect leaks within the membrane or to detect wetted pores.

In typical VMD systems, the vapour pressure of the retentate/distilland stream and the absolute pressure of the vapour space of the VMD systems are essentially maintained at the same pressure to avoid high mechanical loading of the distillation membranes. When the liquid entry pressure of a distillation membrane is exceeded, pore wetting occurs rendering the distillation membrane ineffective. A method to avoid high mechanical loading of the distillation membrane in VMD systems is disclosed in U.S. Pat. No. 8,029,675, published on 4 Oct. 2011 in the name of Wolfgang Heinzl. This publication discloses a process and apparatus whereby a negative pressure is imparted to the retentate stream, lowering the absolute pressure of retentate stream. Specifically, the pressure of the retentate stream is lowered to the negative pressure level of the vapour gap in the VMD system.

Existing proposed VMD systems avoid overloading of the distillation membrane by lowering the pressure of the retentate/distilland stream to the negative pressure level of the VMD system. In such systems, as the pressure differential between the retentate stream and the vapour gap are kept to a minimum, the resulting rate of flux across the distillation membranes are lower. In such systems, the evaporated water molecules are transferred across the distillation membrane through diffusion, from the side with the higher temperature to the side with the lower temperature. Hence, such systems typically require a minimum number of membrane modules for these systems to be commercially viable.

Existing membrane distillation systems are disadvantageous because such systems are typically not efficient enough to be commercially viable. Hence, those skilled in the art are constantly looking for ways to devise a membrane distillation system that has a sufficiently high rate of flux, sufficiently low energy consumption, and excellent filtration rating for the membrane distillation system to be viable on a commercial scale.

SUMMARY OF INVENTION

The above and other problems in the art are solved and an advance in the art is made in accordance with this invention. A first advantage of a Vacuum Air Gap Membrane Distillation (VAGMD) system in accordance with this invention is that the VAGMD system has an extraction outlet that is independent from the condensate collection outlet to remove non-condensable gases from the condensation chamber. A second advantage of a VAGMD system in accordance with this invention is that the VAGMD system utilizes a temperature gradient across the VAGMD system and a vapour pressure gradient across the distillation membrane to achieve a high flux rate and recovery rate. A third advantage of a VAGMD system in accordance with this invention is that a vacuum pressure is applied to the condensation chamber causing the condensation chamber to have a partial vacuum. The partial vacuum within the condensation chamber increases the vapour pressure gradient across the distillation membrane which in turn allows the system to achieve high flux and recovery rate efficiently. A fourth advantage of a VAGMD system in accordance with this invention is that a triple layer composite nanofiber membrane having a liquid-vapour interface that may withstand liquid entry pressures of at least 350 kilopascals may be used with this system resulting in steep vapour pressure gradients across the membrane. This in turn allows the system to achieve high flux and recovery rate efficiently. A fifth advantage of a VAGMD system in accordance with this invention is that the configuration of the VAGMD system allows the feed solution to recover and reuse latent heat from the flow solution. This configuration allows at least 85% of the heat from the flow solution to be recovered thus effectively reducing the overall energy consumption of the VAGMD system.

In accordance with further embodiments of this invention, commercial membranes which have high contact angles (CA>90°), have high liquid entry pressure of water (LEPw) and are highly porous may be used.

In accordance with an embodiment of this invention, the desalination system comprises a distillation membrane having a distilland side and a distillate side; and a condensation sheet having a distillate side and a feed side. The distillate side of the condensation sheet faces the distillate side of the distillation membrane forming a condensation chamber. The condensation chamber has a collection outlet for collecting the condensate and an extraction outlet for extracting the non-condensable gases within the condensation chamber. Vacuum generating means are connected to the collection and extraction outlets to provide a vacuum to the condensation chamber and to facilitate the collection and extraction processes. In operation, a flow solution will be in fluid communication with the distilland side of the distillation membrane and a feed solution will be in fluid communication with the feed side of the condensation sheet. The temperature of the flow solution will also be higher than the temperature of the feed solution.

In accordance with an embodiment of this invention, a negative pressure is supplied to the collection and extraction outlets to cause the condensation chamber to have a partial vacuum.

In accordance with an embodiment of this invention, a first negative pressure is provided to the collection outlet and a second negative pressure is provided to the extraction outlet.

In accordance with further embodiments of this invention, collection means are connected to the collection outlet and extraction means are connected to the extraction outlet. The collection means and the extraction means may comprise a pump and a thermo-compressor or injector. The collection means is used to collect the condensate from the condensation chamber while the extraction means is used to extract the non-condensable gases from the condensation chamber. Furthermore, the flow solution's latent heat is transferred to the feed solution when the water vapour condenses at the distillate side of the condensation sheet.

In accordance with further embodiments of this invention, a heat exchanger is provided. The heat exchanger is in fluid communication with the feed solution and the flow solution. The heat exchanger receives and increases the temperature of the feed solution before dispensing the heated feed solution as the flow solution.

In accordance with further embodiments of this invention, feed solution may comprise saline and the flow solution may comprise heated saline.

In accordance with a further embodiment of this invention, the collection outlet and the extraction outlet are located at opposing ends of the condensation chamber.

In accordance with further embodiments of this invention, the distance between the condensation sheet and the distillation membrane is between 2 mm and 4 mm.

In accordance with further embodiments of this invention, the distillation membrane may comprise a triple layer composite nanofiber membrane having a liquid-vapour interface that may withstand a liquid entry pressure of at least 350 kilopascals.

In accordance with a further embodiment of this invention, the distillation system may comprise a plurality of VAGMD cells which may be cascaded together to form a module.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a vacuum air gap membrane distillation system for desalination. More particularly, this invention relates to a membrane distillation system with multiple cells for a highly efficient desalination process that requires minimal energy consumption.

Figure 1:
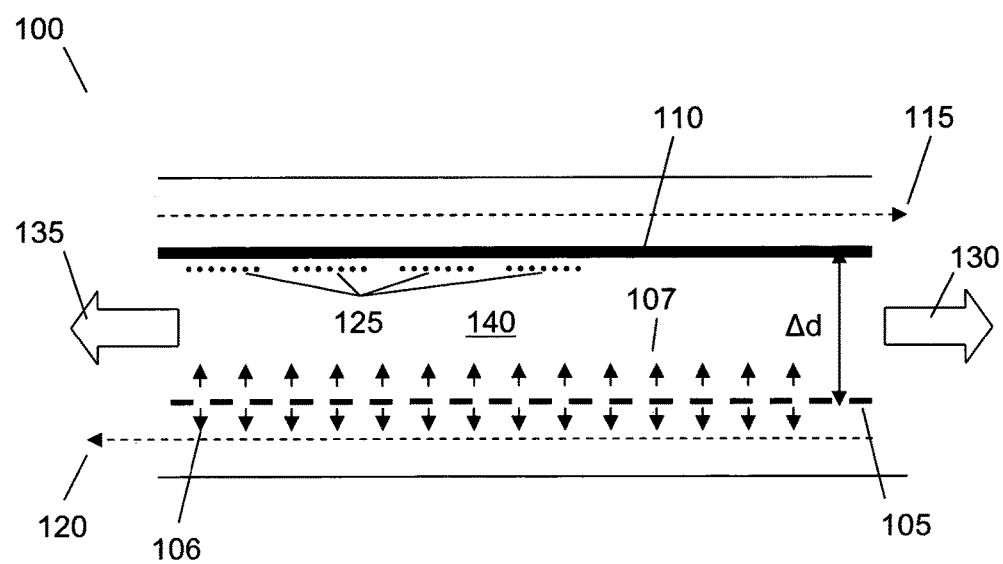
FIG. 1 illustrating a single cell membrane distillation system in accordance with an embodiment of this invention.

A single cell Vacuum Air Gap Membrane Distillation (VAGMD) system in accordance with an embodiment of this invention includes a cavity for a feed solution, a cavity for a flow solution, a cavity for the collection of the evaporated water vapour, a distillation membrane and a condensation sheet. FIG. 1 illustrates such a single cell VAGMD system in accordance with an embodiment of this invention. VAGMD system 100 includes distillation membrane 105, condensation sheet 110, a cavity for feed solution 115, a cavity for flow solution 120, and condensation chamber 140 that is bounded on either side by distillation membrane 105 and condensation sheet 110.

The distilland side of distillation membrane 105 is in fluid communication with flow solution 120 and the distillate side of distillation membrane 105 faces the distillate side of condensation sheet 110. The distilland side of distillation membrane 105 is illustrated by arrows 106 and the distillate side of distillation membrane 105 is illustrated by arrows 107. Distillation membrane 105 may comprise any vapour permeable, liquid tight membrane with sufficiently high liquid entry pressure barriers. The membranes must have sufficiently high liquid entry pressure barriers to ensure that the pores of the membranes are not wetted when the pressure difference across the membrane is increased. An example of such a membrane would be a triple layer composite nanofiber membrane as disclosed in FIG. 3. The composite nanofiber membrane will be discussed in greater detail below. Condensation sheet 110 may be any type of non-permeable, heat conducting non-porous sheet such as a polyester sheet, polypropylene sheet or a Polytetrafluoroethylene (PTFE) sheet. The function of condensation sheet 110 is to provide a surface for the condensation of water vapours contained within condensation chamber 140. The feed side of condensation sheet 110 is in fluid communication with feed solution 115 and the distillate side of condensation sheet 110 faces the distillate side of distillation membrane 120. Additionally, the distance, $\Delta d$, between the distillate side of distillation membrane 105 and the distillate side of condensation sheet 110 has to be chosen carefully as distance $\Delta d$ affects the performance of VAGMD system 100. Distance $\Delta d$ contributes to the mass transfer resistance of VAGMD system 100. In operation, when distance $\Delta d$ is increased, the permeate flux of the system will increase until the permeate flux reaches a peak. Once the permeate flux of the system reaches this peak, the permeate flux of the system reduces as distance Δd increases. The decrease in the system's permeate flux is attributed to the increase in mass transfer resistance as distance Δd increases. The relationship between Δd and the permeate flux of the system is shown in Table 2 below.

In operation, feed solution 115 is maintained at a lower temperature than flow solution 120. A vacuum pressure supplied to collection outlet 135 and extraction outlet 130 will result in a partial vacuum forming within condensation chamber 140. Evaporated water vapour molecules will drift and diffuse across distillation membrane 105, from flow solution 120 to condensation chamber 140, due to the temperature difference and pressure difference between condensation chamber 140 and flow solution 120. The water vapour within condensation chamber 140 will condense on the distillate side of condensation sheet 110 forming condensate 125. Condensate 125 is collected at collection outlet 135. Any non-condensable gases contained within condensation chamber 140 is extracted out through extraction outlet 130.

Figure 2:
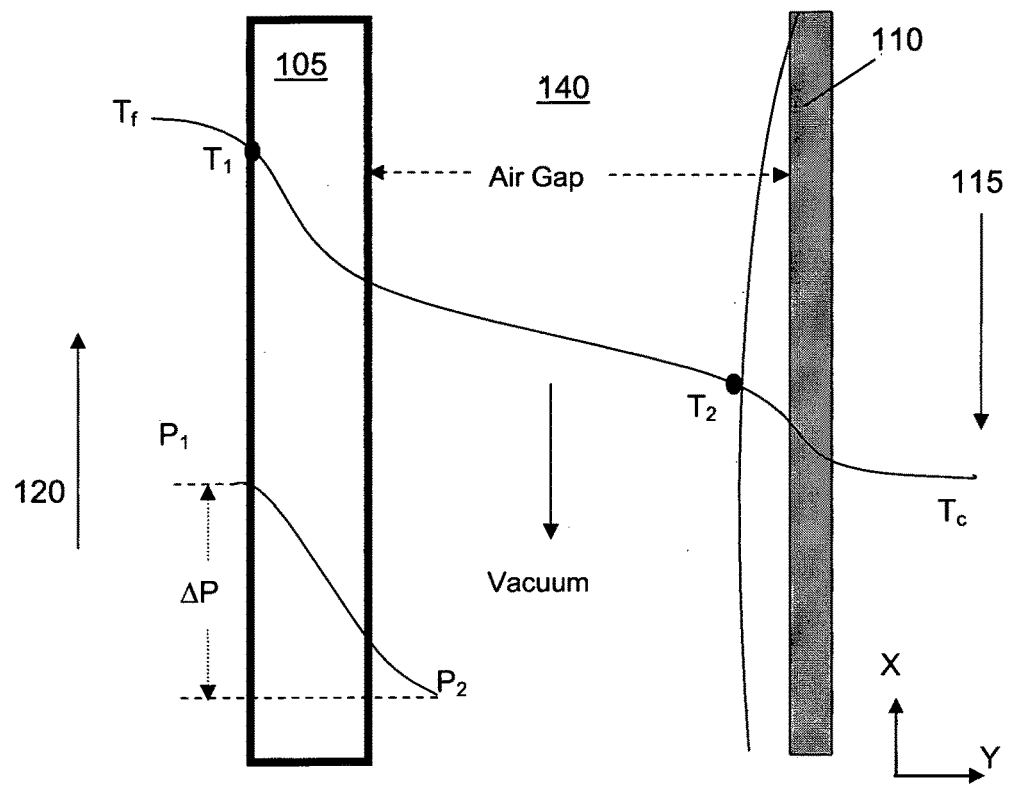
FIG. 2 illustrating the pressure and temperature distribution across a single cell of a membrane distillation system in accordance with an embodiment of this invention.

FIG. 2 illustrates the temperature profile across single cell VAGMD system 100. The vapour pressure profile across membrane 105 is illustrated in this diagram as well. As mentioned above, in operation, feed solution 115 is maintained at a lower temperature than flow solution 120. As shown in FIG. 2, due to the temperature difference between feed solution 115 and flow solution 120, a temperature gradient profile exists between these two solutions. Vaporizing water molecules from flow solution 120 diffuse across distillation membrane 105 to condensation chamber 140 which has a lower temperature than flow solution 120. The steeper that the temperature gradient is across distillation membrane 105, the faster the water molecules vaporize and drift across to condensation chamber 140. The distillate side of condensation sheet 110 is at a lower temperature than the distillate side of distillation membrane 105. This temperature difference causes vaporized water molecules to diffuse towards condensation sheet 110. The water molecules then condense at the surface of condensation sheet 110 forming condensate 125 (as shown in FIG. 1). Due to the excellent heat conductivity of condensation sheet 110, the surface of condensation sheet 110 is maintained around the same temperature as feed solution 115.

Figure 3:
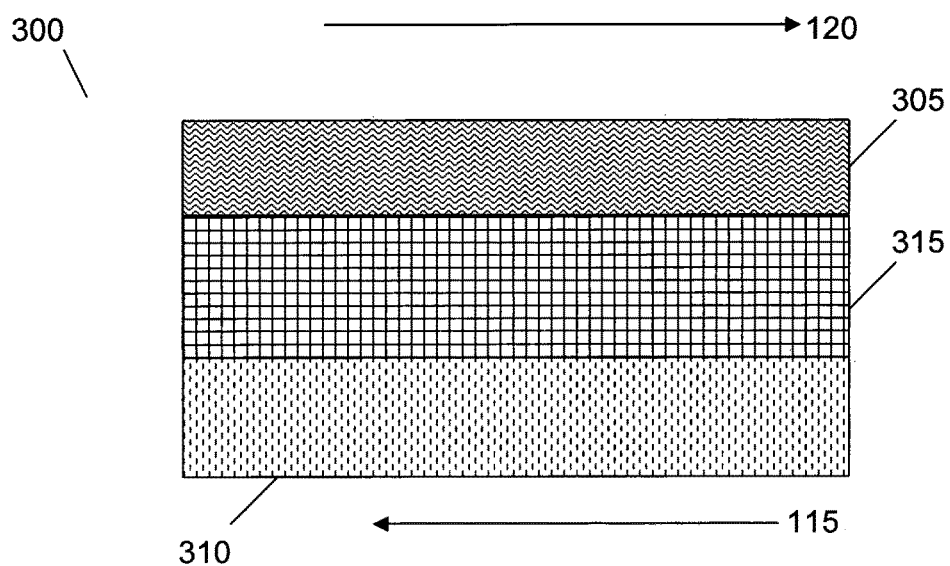
FIG. 3 illustrating a cross sectional view of a triple layer composite nanofiber membrane in accordance with an embodiment of this invention.

Additionally, a vacuum pressure is supplied to condensation chamber 140 creating a partial vacuum environment within condensation chamber 140. This results in a pressure gradient as shown in FIG. 2. As the pressure difference across distillation membrane 105 increases, the flux across distillation membrane 105 increases as well. Hence, in VAGMD system 100, there are two driving forces that affect the flux and distillation rate of the system. The driving forces are the temperature gradient across VAGMD system 100 and the vapour pressure gradient across distillation membrane 105. In typical membrane distillation systems, the pressure difference across the distillation membrane is typically minimized in order to avoid high mechanical and thermal loading of the distillation membrane which will lead to pore wetting. For this invention, in contrast with the practice adopted by typical membrane distillation systems, the pressure difference across distillation membrane 105 is maintained as large as possible to ensure that the flux across distillation membrane 105 is at the maximum allowable rate. Furthermore, the condensed water in condensation chamber 140 is continuously removed hence reducing the tendency of pore wetting of distillation membrane 105. Pore wetting of distillation membrane 105 may be avoided by using a triple layer composite nanofiber membrane as illustrated in FIG. 3. Hence, this invention is able to fully utilize both driving forces in order to achieve an efficient distillation system recovery rate and flux rate across the distillation membrane.

FIG. 3 illustrates triple layer composite nanofiber membrane 300 that may be used in an embodiment of this invention. A complete description of such a triple layer composite membrane is provided in PCT application No. PCT/SG2011/000407 in the name of Ngee Ann Polytechnic filed on 17 Nov. 2011. As illustrated in FIG. 3, the outer surface of electrospun nanofiber layer 305 is adjacent feed solution 120 while the outer surface of backing layer 310 is the distillate side, facing the distillate side of condensation sheet 110. Microporous layer 315 acts as a filter, removing contaminants from the vapour evaporating from feed solution 120. The filtered vapour then diffuses across condensation chamber 140 and condenses at a surface of condensation sheet 110 where the temperature is lower. With the addition of electrospun nanofiber layer 305 at the flow solution side, the hydrophobicity of composite membrane 300 increases greatly. Due to the increased hydrophobicity contributed by electrospun nanofiber layer 305, composite membrane 300 may be used efficiently and effectively in membrane distillation applications as the pores in microporous layer 315 are now effectively protected by the much more hydrophobic nanofiber layer 305. In composite membrane 300, liquid-vapour interfaces form at the entrances of membrane pores at the border where flow solution 120 adjoins nanofiber layer 305 and, vapour-liquid interfaces form at the entrances of membrane pores at the border where microporous layer 315 adjoins backing layer 310. Evaporation takes place at the liquid-vapour interface where flow solution 120 adjoins nanofiber layer 305 and the water molecules diffuse across condensation chamber 140 to condensation sheet 110.

Electrospun nanofiber layer 305 may be formed on the first surface of microporous layer 315 using an electrospinning technique. When microporous layer 315 is manufactured using hydrophobic materials such as PVDF, the contact angle of microporous layer 315 is between 70° to 130°. Due to the contact angle of microporous layer 315, liquid droplets will still partially spread out across the surface of microporous layer 315. The spreading of liquid droplets across the membrane surface is deleterious for membrane distillation applications as the pores in microporous layer 315 will get water logged easily, rendering the membrane useless. By depositing electrospun nanofiber layer 305 onto the first surface of microporous layer 315, the hydrophobicity of the membrane increases greatly as the contact angle of nanofiber layer 305 is between 140° to 160°. Due to the extremely high hydrophobicity of nanofiber layer 305 formed on microporous layer 315, the pores of microporous layer 315, will not get water logged as easily. Nanofiber layer 305 has pore sizes between 0.05 μm to 5.0 μm. Due to the porosity and pore sizes of nanofiber layer 305, air is trapped between the pores, forming air bubbles within nanofiber layer 305. These bubbles of air act as thermal insulators preventing the heat transfer between flow solution 120 and feed solution 115 effectively reducing heat loss of the system.

Another advantage of utilizing composite membrane 300 in VAGMD system 100 is that these membranes are able to withstand a liquid entry pressure (LEP) higher than that of typical distillation membranes. This property of composite membrane 300 allows for a steep pressure gradient to exist across composite membrane 300 which in turn results in an increase in the rate of flux across the membrane. Table 1 below shows the comparison between the LEP of various combinations of the respective layers.

TABLE 1

| Types of Layers | LEP (Kilopascal) |
| --- | --- |
| An electrospun nanofiber layer (305) | 20 |
| A wet casted microporous layer (315) | 200 |
| A melt blown fiber backing layer (310) | 20 |
| Combination of layers (305) and (315) | 250 |
| Combination of layers (305) and (310) | 20 |
| Combination of layers (315) and (310) | 250 |
| Composite membrane (300) which is a combination of layers, (305), (315) and (310) | 350 |

As can be seen from Table 1, composite membrane 300 is able to withstand a liquid entry pressure of 350 kilopascals. Individually, nanofiber layer 305 is able to withstand a LEP of less than 20 kilopascals, microporous layer 315 is able to withstand a LEP of 200 kilopascals and backing layer 310 is able to withstand a LEP of less than 20 kilopascals. When these individual layers are added together, one skilled in the art would expect the overall LEP would be the sum of the LEP of the three layers that is 240 kilopascals. It can be seen from Table 1 that composite membrane 300 is able to withstand a LEP of at least 350. Thus, not only does composite membrane 300 have high hydrophobicity, composite membrane 300 also boasts of unexpectedly high levels of LEP, being able to withstand LEPs well above the sum of the three individual layers. Hence, by utilizing membrane 300 in embodiments of our invention, the pressure gradient across distillation membrane 105 may be fully utilized to increase the flux of the VAGMD system. Membrane 300, which is disclosed in PCT Application No. PCT/SG2011/000407, is incorporated herein with reference to the abovementioned PCT application.

Figure 4:
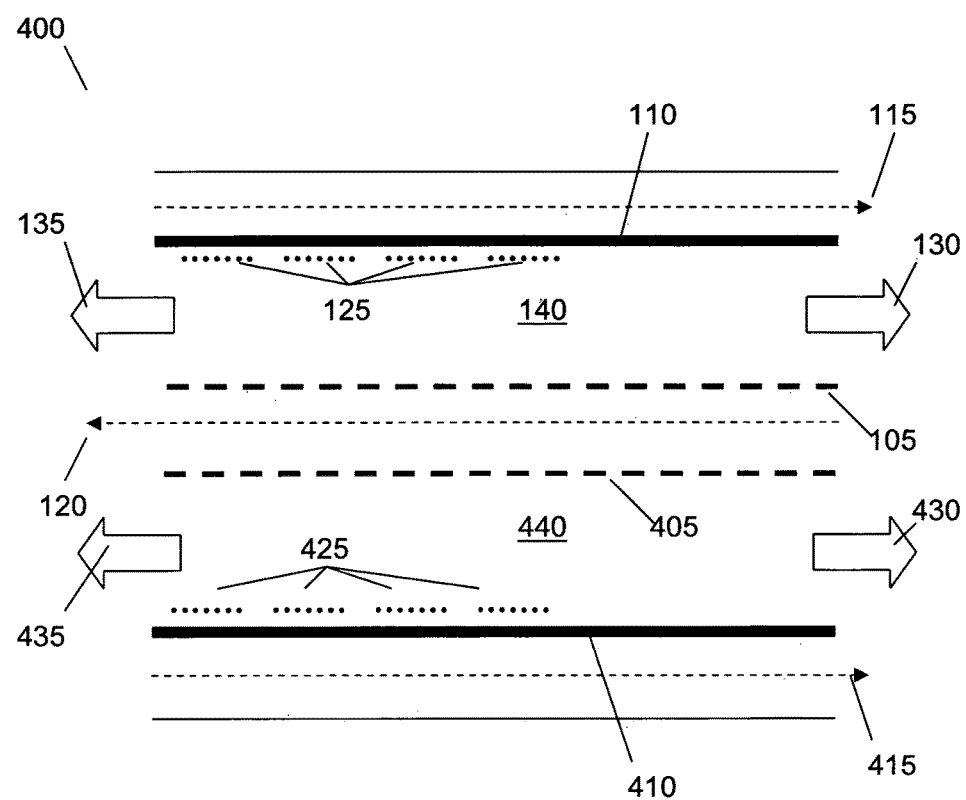
FIG. 4 illustrating a dual cell membrane distillation system in accordance with an embodiment of this invention.

Single cell VAGMD system 100 may be cascaded with another single cell VAGMD system to increase the desalination recovery rate of the system. FIG. 4 illustrates such a dual cell VAGMD system. Dual cell VAGMD system 400 includes distillation membranes 105, 405, condensation sheet 110, 410, cavities for feed solutions 115, 415, a cavity for flow solution 120, and condensation chambers 140, 440 that are bounded on either side by distillation membranes 105, 405 and condensation sheet 110, 410 respectively. In operation, feed solutions 115, 415 are maintained at a lower temperature than flow solution 120. A vacuum pressure supplied to collection outlets 135, 435 and extraction outlets 130, 430 will result in a partial vacuum forming within condensation chambers 140, 440. For dual cell VAGMD system 400, as flow solution 120 flows through between distillation membranes 105, and 405, evaporated water molecules drift and diffuse across distillation membranes 105, 405 to the respective condensation chambers. The rate of flux across distillation membrane 105 is equivalent with the rate of flux across distillation membrane 405. Hence, by cascading the two VAGMD cells together, this results in an increase in the overall flux of the system and in the recovery rate of the system.

Figure 5:
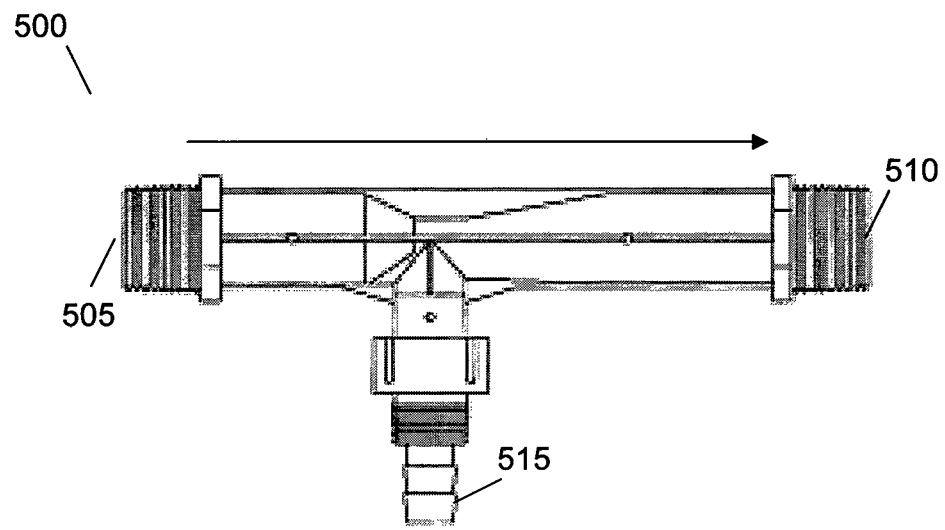
FIG. 5 illustrating a thermo compressor in accordance with an embodiment of this invention.

In FIGS. 1 and 4, partial vacuum were applied to condensation chambers 140, 440 through collection outlets 135, 435 and extraction outlets 130, 430. FIG. 5 illustrates thermo-compressor 500 that may be used to produce the vacuum required for the system. A thermo-compressor is a pump-like device that converts the pressure energy of a fluid to velocity energy. The direction of the flow of the fluid within thermo-compressor 500 is illustrated by the arrow in FIG. 5. A cone located adjacent the inlet of the thermo-compressor utilizes the velocity energy to generate a low pressure zone within the thermo-compressor. The low pressure zone draws in suction fluid from an adjacent inlet. The fluid may be a liquid, steam or any other gas. In operation, fluid is applied to inlet 505 to generate a low pressure zone within the thermo-compressor. As a result, fluid is suctioned in through inlet 515. The combined fluid from inlet 505 and inlet 515 exits the thermo-compressor at outlet 510. The suction at inlet 515 generates a negative pressure or a vacuum that may be supplied to the VAGMD system via the collection outlets or extraction outlets. One skilled in the art will recognize that a thermo-compressor may comprise an injector, ejector, steam ejector, steam injector, or Eductor-jet pump. One skilled in the art will also recognize that a conventional vacuum generator may be used in the place of a thermo-compressor.

Figure 6:
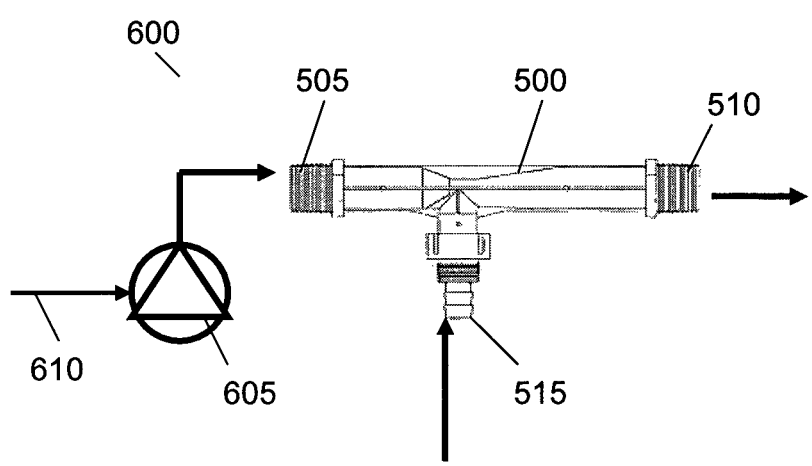
FIG. 6 illustrating the operation of a thermo compressor in accordance with an embodiment of this invention.

FIG. 6 illustrates thermo-compressor 600 that may be used with an embodiment of the invention. Pump 605 draws in liquid 610 and pumps liquid 610 to inlet 505 of thermo-compressor 500. The liquid pressure at inlet 505 is then converted to velocity energy. The velocity energy generates a low pressure zone within thermo-compressor 500 creating a suction force at inlet 515. This suction force produces a vacuum pressure that may be applied to a VAGMD system. Liquid 610 that has passed through thermo-compressor 500 then exits through outlet 510. One skilled in the art will recognize other types of thermo-compressors may be used without departing from this invention.

Figure 7:
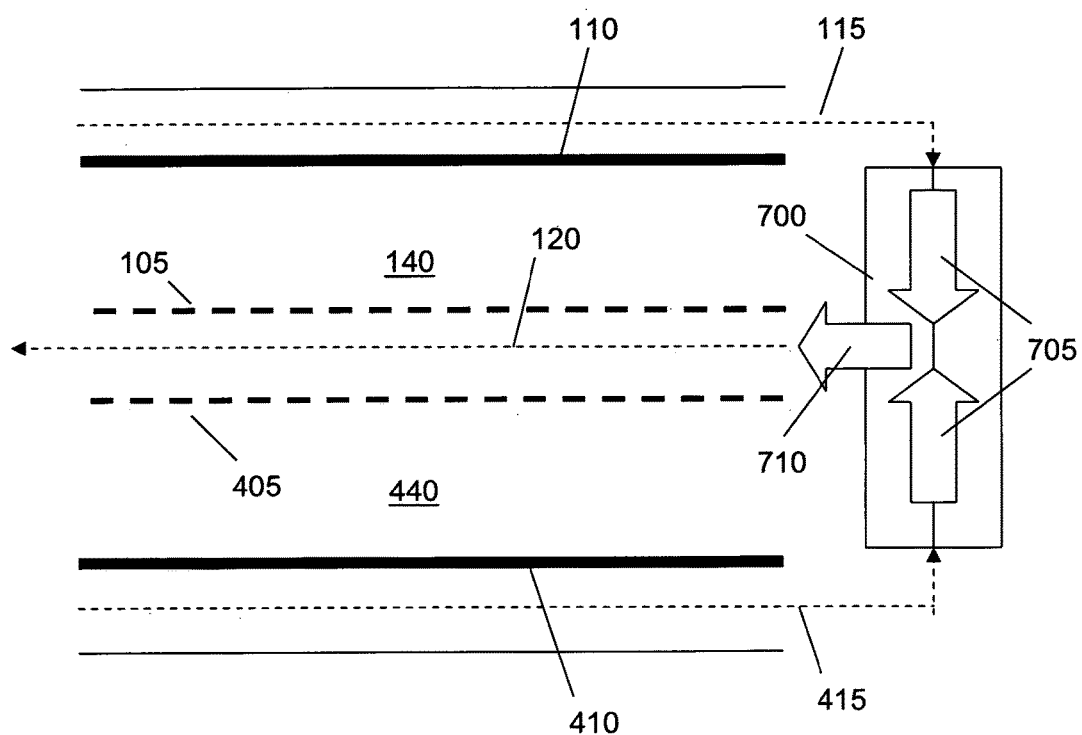
FIG. 7 illustrating a dual cell membrane distillation system with a heat exchanger in accordance with an embodiment of this invention.

FIG. 7 illustrates heat exchanger 700 that may be used with a VAGMD system in accordance with an embodiment of this invention. Heat exchanger 700 has feed path 705 for receiving feed solution 115, 415. Heat exchanger 700 also has flow path 710 for dispensing flow solution 120. In operation, feed solution 115, 415 are heated within feed path 705. The heated liquid is then dispensed as flow solution 120 through flow path 710. Heat exchanger 700 may be any device that may be used to alter the temperature of liquids such as water heaters powered by renewable energy sources (e.g. solar energy) or by regular energy sources (e.g. gas, electricity). One skilled in the art will recognize that heat exchanger 700 may comprise any means for heating and/or cooling liquids without departing from this invention.

In another embodiment, in order to increase the energy efficiency of VAGMD system 100, heat exchanger 700 may comprise of passive solar heating means. Specifically, feed solution 115 may be directed through a heating cavity that is directly exposed to the sun. The heating cavity may be made from materials that have excellent heat exchanging properties such as the materials used in condensation sheets 110. As feed solution 115 passes through the heating cavity, feed solution 115 is then heated using solar energy. Heated feed solution 115 is then dispensed as flow solution 120.

Figure 8:
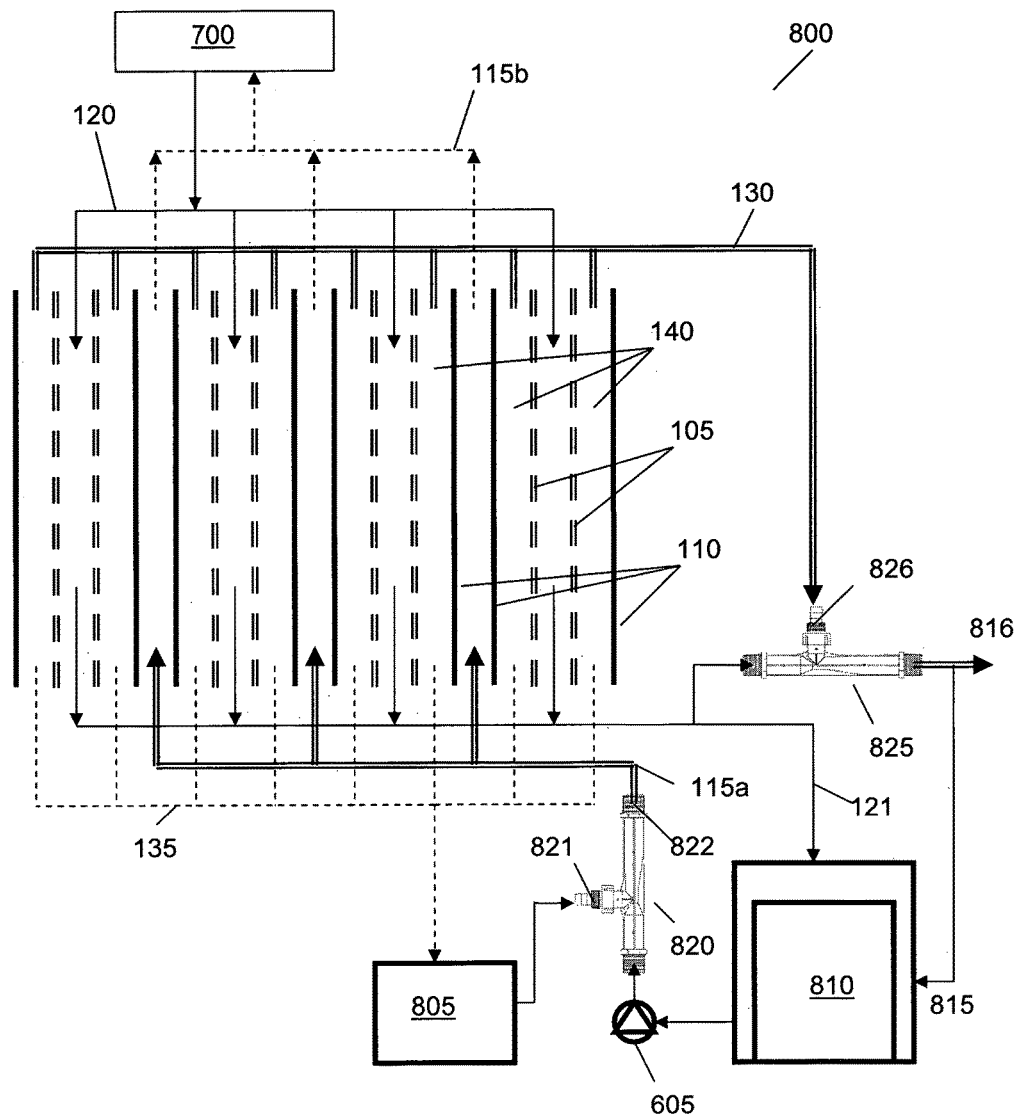
FIG. 8 illustrating a membrane distillation system in accordance with an embodiment of this invention.

FIG. 8 illustrates multiple cell VAGMD system 800 in accordance with an embodiment of this invention. VAGMD system 800 comprises a plurality of cavities for feed solution 115 and flow solution 120. VAGMD system 800 also comprises a plurality of condensation chambers 140, distillation membranes 105, and condensation sheet 110. As shown in FIG. 8, the distillate side of distillation membranes 105 faces the distillate side of condensation sheet 110 forming condensation chambers 140. Distillation membranes 105 are arranged within VAGMD system 800 such that each distilland side of each distillation membrane faces the distilland side of an adjacent distillation membrane forming a cavity for flow solution 120. Collection outlets 135 are located at one end of condensation chambers 140 and extraction outlets 130 are located at an opposing end of condensation chambers 140. One skilled in the art will recognize that collections outlets 135 and extraction outlets 130 may be located at other locations in condensation chamber 140 without departing from this invention.

In operation, thermo-compressors 820, 825 are used to supply vacuum or negative pressure to condensation chambers 140. Pump 605 is used to pump feed solution 115 from feed tank 810 into thermo-compressor 820. The pumping of feed solution 115 into thermo-compressor 820 creates a low pressure zone within thermo-compressor 820 which in turn produces a suction force at inlet 821. Inlet 821 is connected to tank 805 which in turn is connected to collection outlets 135. As such, condensation chambers 140 are provided with a vacuum or negative pressure causing condensation chambers 140 to have a partial vacuum within. Feed solution 115$a$ exits thermo-compressor 820 at outlet 822.

Feed solution 115$a$ is then directed through the feed solution cavities within the multiple cell VAGMD module. It should be noted that at this stage, the temperature of feed solution 115$a$ is typically at an ambient room temperature or lower. Hence, as the feed side of condensation sheet 110 are in fluid communication with feed solution 115$a$, the non-permeable surfaces of condensation sheets will be at the same temperature as feed solution 115$a$. Feed solution 115$b$ which exits the multiple cell VAGMD module at the other end is then directed towards heat exchanger 700. Feed path 705 within heat exchanger 700 receives feed solution 115$b$. The temperature of feed solution 115$b$ increases as feed solution 115$b$ passes through feed path 705. When multiple cell VAGMD system 800 is initialized, a heating element within heat exchanger 700 will heat feed solution 115$b$ from room temperature to an ideal distillation temperature, between 80-100° C. Subsequently, heat exchanger 700 will not be required to heat feed solution 115$b$ from the low ambient room temperature as the arrangement of multiple cell VAGMD system 800 allows for an efficient heat recovery process. This heat recovery process is described in the subsequent paragraph.

Flow path 710 within heat exchanger 700 then dispenses the heated feed solution as flow solution 120. Flow solution 120 is then directed towards cavities for flow solution 120 located within the multiple cell VAGMD module. As shown in FIG. 8, flow solutions 120 are bounded on either side by the distillate side of distillation membranes 105. As flow solution 120 passes through the flow solution cavities, flow solution 120 undergoes an evaporation process. The vaporizing liquid then diffuses and drifts across distillation membranes 105 into condensation chambers 140. The main driving forces affecting the flux across distillation membranes 105 are the temperature and vapour pressure differences between flow solutions 120 and condensation chambers 140. The evaporated water molecules then condense at the distillate side of condensation sheet 110 forming condensates which are collected by collection outlets 135. As the evaporated water molecules condenses at condensation sheet 110, the heat contained within these water molecules are transferred to condensation sheet 110 which in turn transfers the heat to feed solution 115$a$. Through this heat transfer process, it was found that feed solution 115$a$ was able to recover at least 85% of the heat from flow solution 120. Therefore, when feed solution 115$b$ exits the multiple cell VAGMD module at the other end, the temperature of feed solution 115$b$ would be just slightly below the ideal distillation temperature of the system. As such, heat exchanger 700 would require less energy to heat feed solution 115$b$ to the ideal distillation temperature range that is between 80-100° C.

As flow solution 120 passes through the module, flow solution 120 looses some of its heat through evaporation resulting in cooler flow solution 121. Cooler flow solution 121 is then directed to thermo-compressor 825 and into feed tank 810. Part of cooler flow solution 121 is used at thermo-compressor 825 to create a suction force at inlet 826. Inlet 826 is connected to extraction outlets 130 to provide a negative pressure to condensation chambers 140. Hence, the partial vacuum contained within condensation chambers 140 are formed by thermo-compressors 820 and 825. The negative pressure supplied to extraction outlets 130 extracts non-condensable gases from condensation chambers 140.

Non-condensable gases may comprise of gases that are dissolved in flow solution 121 such as carbon dioxide from the thermal decomposition of bi-carbonates. Non-condensable gases are detrimental to any membrane distillation system as these gases may clog or block the distillation membrane's pores. This in turn results in a reduction of the system's vapour flux due to the reduction in the condensation heat transfer coefficient of the system. The presence of non-condensable gases within a distillation system may also cause an increase in the mass transfer resistance of the system which in turn causes the vapour transport rate to be mass transfer limited.

If only a single outlet were to be utilized for both the extraction of the non-condensable gases and for the collection of the condensate, the non-condensable gases would not be able to be removed sufficiently as the condensate would plug up the single outlet. As such, in VAGMD system 100, the non-condensable gases are removed primarily though extraction outlet 130 while the condensate is collected at collection outlet 135. When the non-condensable gases are removed from condensation chamber 140 and from the pores of distillation membrane 105 in VAGMD system 100, the vapour pressure difference between flow solution 120 and condensation chamber 140 will increase across distillation membrane 105. This in turn results in an increase in the membrane distillation flux of VAGMD system 100. The increased vapour pressure difference across distillation membrane 105 assists in the removal of water molecules and $CO_2$ molecules that clog the pores of distillation membrane 105. By clearing the clogged pores of distillation membrane 105, this effectively reduces the tendency of membrane wetting and reduces the mass transfer resistance across distillation membrane 105. Water vapour may then pass freely through distillation membrane 105 to condense on the surface of condensation sheet 110 within condensation chamber 140. This condensation process ensures that the vapour density within condensation chamber 140 remains at a constant level. I The VAGMD distillation process then repeats itself to continuously recover distilled water from the feed solution. The multiple cell VAGMD system shown in FIG. 8 is an extremely energy efficient system and the disclosed system only requires a single pump, i.e. pump 605, to drive the entire system. Furthermore, heat exchanger 700 only needs to initially heat feed solution 115$b$ to a much higher temperature. Subsequently, due to the configuration of multiple cell VAGMD system 800, heat exchanger 700 only needs to slightly increase the temperature of feed solution 115$b$. Furthermore, unlike conventional Vacuum Membrane Distillation systems, multiple cell VAGMD system 800 does not require an external condenser.

The following examples illustrate embodiments of this invention. One skilled in the art will realize that the examples set out below are not an exhaustive list of the embodiments of this invention.

Example 1

The setup in Example 1 was prepared in order to compare the performance of various types of membrane distillation systems. The various types of membrane distillation systems utilized in Example 1 are Direct Contact Membrane Distillation (DCMD), Air Gap Membrane Distillation (AGMD), Vacuum Membrane Distillation (VMD) and a Vacuum Air Gap Membrane Distillation (VAGMD) system in accordance with an embodiment of this invention. A flat sheet PVDF membrane with an effective area of 0.015 m² was used as the distillation membrane and a metal plate was used as the condensation sheet. A 3.5 wt % sodium chloride solution was used as the feed solution. In order to ensure that the concentration of the feed solution remains constant throughout the experiment, fresh water was constantly added to the feed solution to compensate for the water lost during the distillation processes. For this experiment, only single cell membrane distillation systems were tested.

For the DCMD, VMD and AGMD systems, the feed solution which is at an ambient room temperature is pumped through the system and the feed solution is heated in a heat exchanger to produce a flow solution. The flat sheet PVDF membrane is then positioned such that the hydrophobic side of the PVDF membrane is in fluid communication with the flow solution. For the DCMD system, a cooler fresh water supply is supplied to the other side of the flat sheet PVDF membrane while for the VMD system, a vacuum of −0.6 bar was supplied. For the AGMD system, the feed solution was in fluid communication with the feed side of the metal plate (i.e. the condensation sheet) causing condensate to form on the other side. The air/vacuum gap between the distillation membrane and the condensation sheet for the AGMD and VMD systems were maintained at 3 mm.

Figure 9:
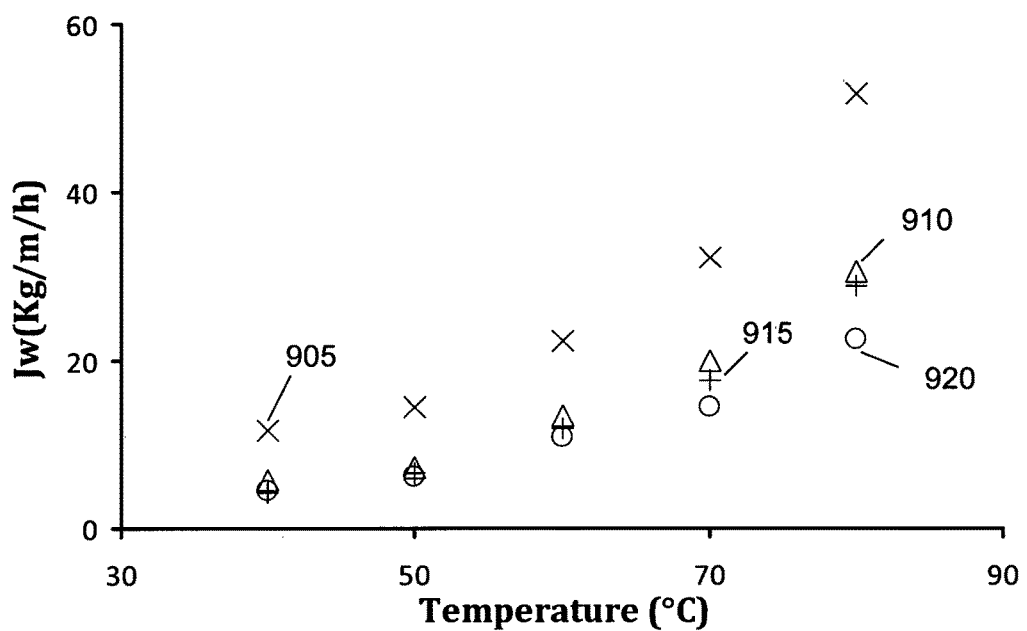
FIG. 9 illustrating the flux density of a DCMD, VMD, AGMD and a membrane distillation system in accordance with an embodiment of this invention when the temperature of the distilland is increased.

For the VAGMD system, a single cell VAGMD system as shown in FIG. 1 was prepared for this experiment. A vacuum of −0.6 bar was supplied to the collection outlet and the extraction outlet forming a partial vacuum within the condensation chamber. A similar feed solution was used in this single cell VAGMD setup wherein the feed solution is at an ambient room temperature. As shown in FIG. 1, the feed solution is in fluid communication with the feed side of the metal plate. After flowing past the length of the metal plate, the feed solution is then heated in a heat exchanger to form a flow solution. The flat sheet PVDF membrane is positioned such that the hydrophobic side is in fluid communication with the flow solution and the other side, i.e. the distillate side, faces the distillate side of the metal plate. The flux across the flat sheet PVDF membrane was measured using the well known weight loss method for all four distillation systems and the results are illustrated in FIG. 9. The salt rejection capabilities of all four systems are shown in FIG. 10.

FIG. 9 illustrates the flux across the flat sheet PVDF membrane for DCMD system 910, VMD system 915, AGMD system 920 and VAGMD system 905 in accordance with an embodiment of this invention. As shown in this figure, VAGMD system 905 is able to achieve a higher flux rate than the other three systems under the same conditions. As the temperature of the flow solution increases, the flux of VAGMD system 905 is almost twice the flux rate of the AGMD system 920.

Figure 10:
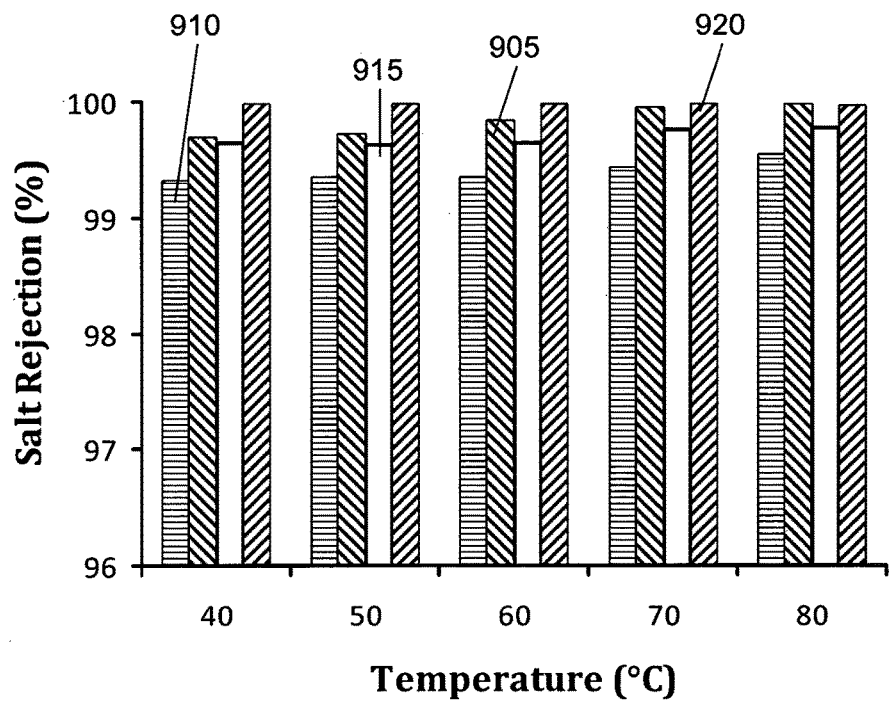
FIG. 10 illustrating the salt rejection capabilities of a DCMD, VMD, AGMD and a membrane distillation system in accordance with an embodiment of this invention when the temperature of the distilland is increased.

FIG. 10 illustrates the salt rejection of DCMD system 910, VMD system 915, AGMD system 920 and VAGMD system 905 in accordance with an embodiment of this invention. As shown in FIG. 10, the salt rejection capabilities of all four systems are about the same, at least 99%.

Figure 11:
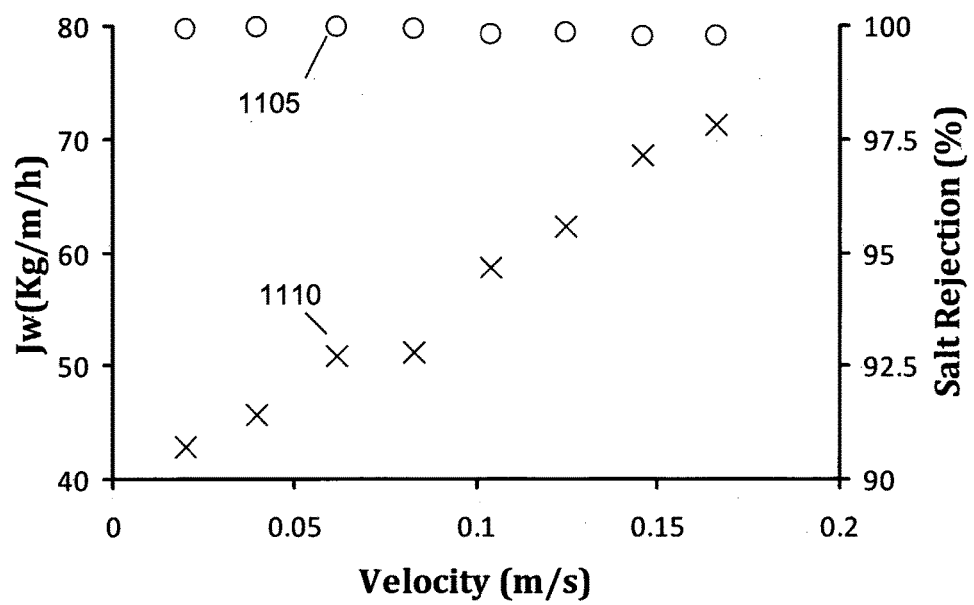
FIG. 11 illustrating the flux density and salt rejection capability of a membrane distillation system in accordance with an embodiment of this invention when the feed velocity is incremented.

Flux 1110 of a VAGMD system in accordance with an embodiment of this invention is illustrated in FIG. 11. In this setup, the feed solution was maintained at 15° C. and the flow solution was maintained at 80° C. As the velocity of the feed solution increases, the flux of the VAGMD system increases as well. This increase in the rate of flux may be attributed to the increase in suction force within the thermo-compressor which in turn results in an increase vacuum pressure being supplied to the collection and extraction outlets. Salt rejection 1105 of the VAGMD system is shown on the secondary axis in FIG. 11 as well.

Figure 12:
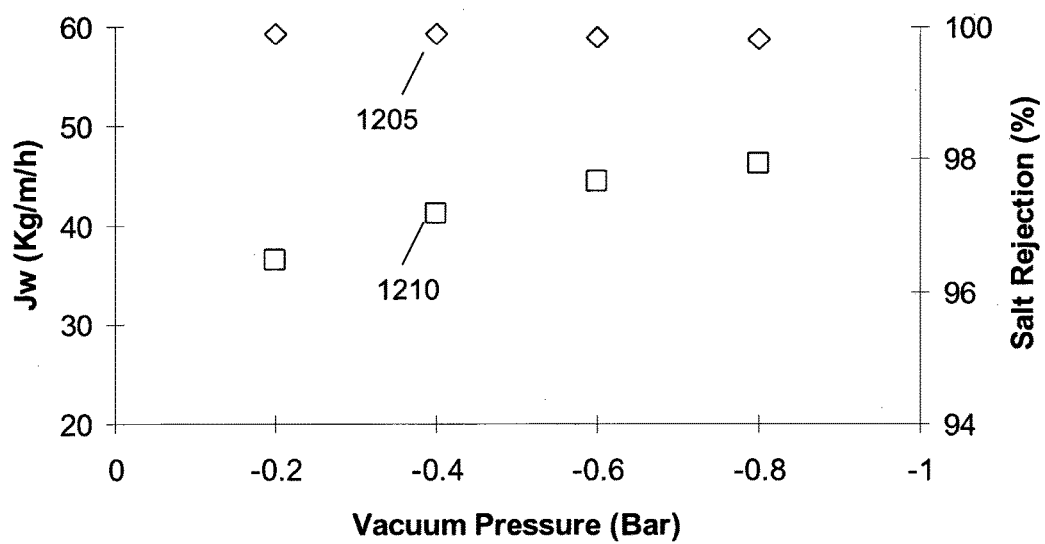
FIG. 12 illustrating the flux density and salt rejection capability of a membrane distillation system in accordance with an embodiment of this invention when the vacuum pressure in the condensation chamber is incremented.

FIG. 12 illustrates flux 1210 of a VAGMD system in accordance with an embodiment of this invention. In this setup, the feed solution was maintained at 15° C. and the flow solution was maintained at 80° C. As the vacuum pressure increases, the flux of the VAGMD system increases as well. Salt rejection 1205 of the VAGMD system is shown on the secondary axis in FIG. 12 as well.

Figure 13:
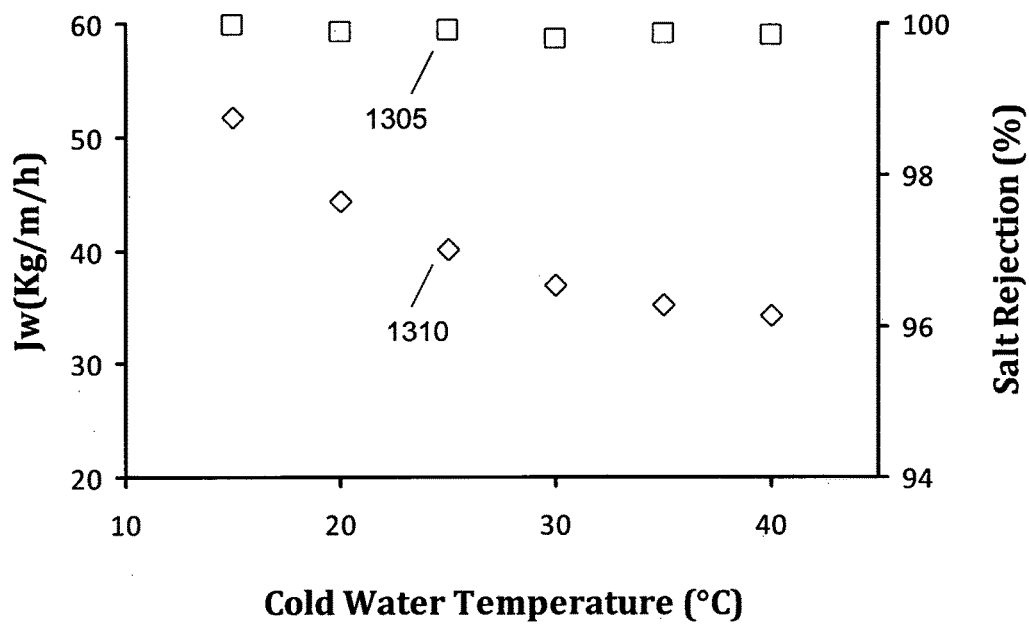
FIG. 13 illustrating the flux density and salt rejection capability of a membrane distillation system in accordance with an embodiment of this invention when the temperature of the feed solution is incremented.

FIG. 13 illustrates flux 1310 of a VAGMD system in accordance with an embodiment of this invention. In this setup, the flow solution was maintained at 80° C. and a vacuum pressure of −0.8 bar was supplied to the collection and extraction outlets. As the temperature of the feed solution increases, the flux of the system decreases. Salt rejection 1305 of the VAGMD system is shown on the secondary axis in FIG. 13 as well.

FIGS. 11, 12 and 13 shows that the main driving forces behind the flux rate of the VAGMD system are the temperature and vapour pressure differences between the feed solution and the condensation chamber. Hence, this invention is advantageous over other conventional membrane distillation systems as this invention is able to utilize both of these driving forces in order to achieve a high flux rate efficiently and effectively. A pilot system based on multiple cell VAGMD system 800, which was completely powered using solar energy, was developed and it was found that the pilot system could produce around 1000 liters of desalinated water a day. Furthermore, the pilot system was found to be extremely energy efficient, being able to produce a cubic meter of distilled seawater for less than 1.25 Kilowatts of electrical energy. This level of efficiency was able to be achieved by replacing the energy consuming vacuum generators/pumps with thermo-compressors. The highly efficient pilot system could recover more than 85% of the heat energy within the membrane module. It was found that the system only consumed between 70 and 250 KW/m³ of thermal energy and was able to achieve high thermal efficiency of gain output ratio (GOR) between 2-10.

The distance, $\Delta d$, between the condensation sheet and the distillation membrane affects the rate of the flux of the VAGMD system. As shown in Table 2 below, the optimum flux rate is achieved when the distance, $\Delta d$, is between 2 mm and 4 mm.

TABLE 2

| Distance, $\Delta d$, (mm) | Flux (LMH) when Flow Solution is at 80° C. | Salt Rejection (%) |
| --- | --- | --- |
| 1 | 39.21 | 99.95 |
| 3 | 51.69 | 99.96 |
| 5 | 46.30 | 99.98 |

Figure 14:
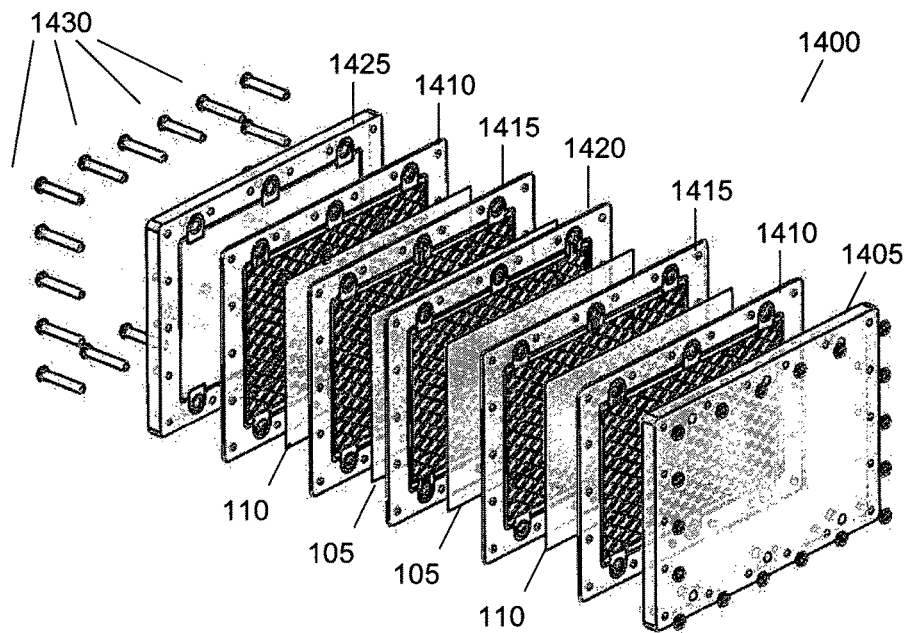
FIG. 14 illustrating a membrane module assembly in accordance with an embodiment of this invention.

A preferred embodiment of multiple cell VAGMD system 800 is shown in FIG. 14. FIG. 14 shows membrane module assembly 1400 comprising of first end plate 1405, cold plate 1410, vacuum plate 1415, hot plate 1420, second end plate 1425 and screws 1430. Condensation sheet 110 is positioned between cold plate 1410 and vacuum, plate 1415 while distillation membrane 105 is positioned between vacuum plate 1415 and hot plate 1420. Screws 1430 fit into the respective grooves on the respective plates; holding all the plates together to form membrane module assembly 1400. Condensation chamber 140 is formed between condensation sheet 110 and distillation membrane 105. From FIG. 14, it can be seen that two condensation chambers are formed within membrane module assembly 1400. One skilled in the art will recognize that a plurality of membrane module assembly 1400 may be cascaded together to form a larger VAGMD system.

Figure 15:
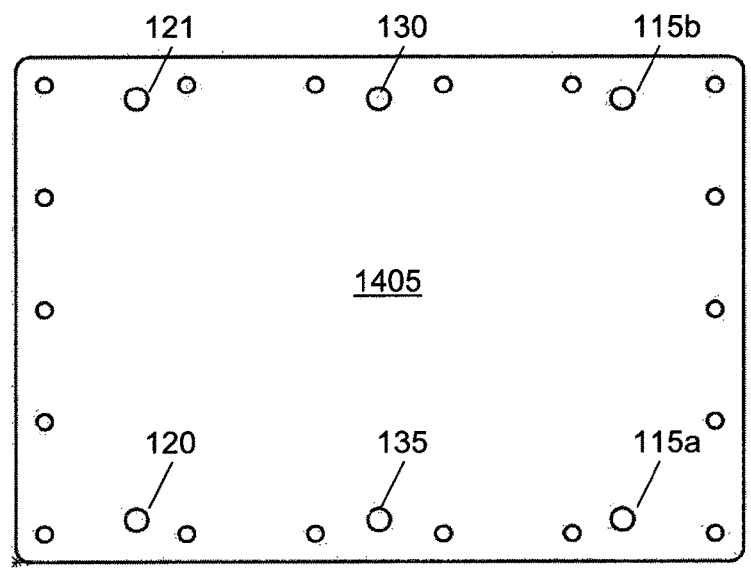
FIG. 15 illustrating a first end plate of the membrane module assembly in accordance with an embodiment of this invention.
Figure 16:
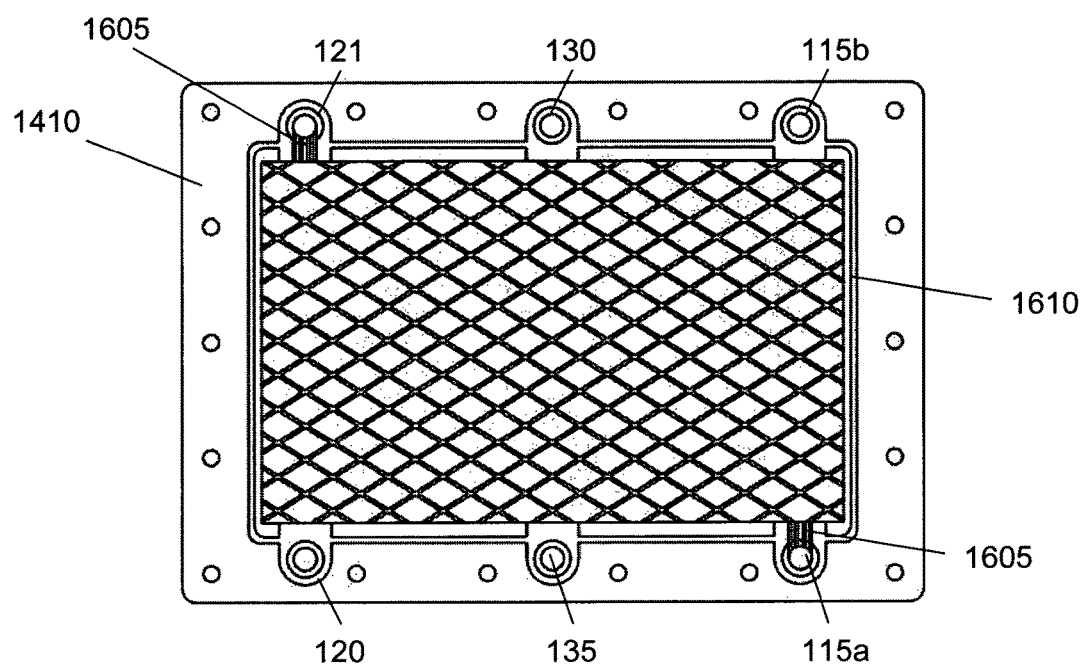
FIG. 16 illustrating a cold plate of the membrane module assembly in accordance with an embodiment of this invention.

FIG. 15 shows the connections of first end plate 1405. Specifically, FIG. 15 shows extraction outlet 130, collection outlet 135, an outlet for cooler flow solution 121, an inlet for warmer flow solution 120, an inlet for cooler feed solution 115*a*, and an outlet for warmer feed solution 115*b*. First end plate 1405 mates with a first side of first cold plate 1410. The connections of cold plate 1410 are shown in FIG. 16. Silicon gasket 1610 encases the inner portion of cold plate 1410 forming a seal around the inner portion of cold plate 1410. Silicon pipes 1605 provide means for cooler flow solution 121 and cooler feed solution 115*a* to be in fluid communication with the inner portion of cold plate 1410.

Figure 17:
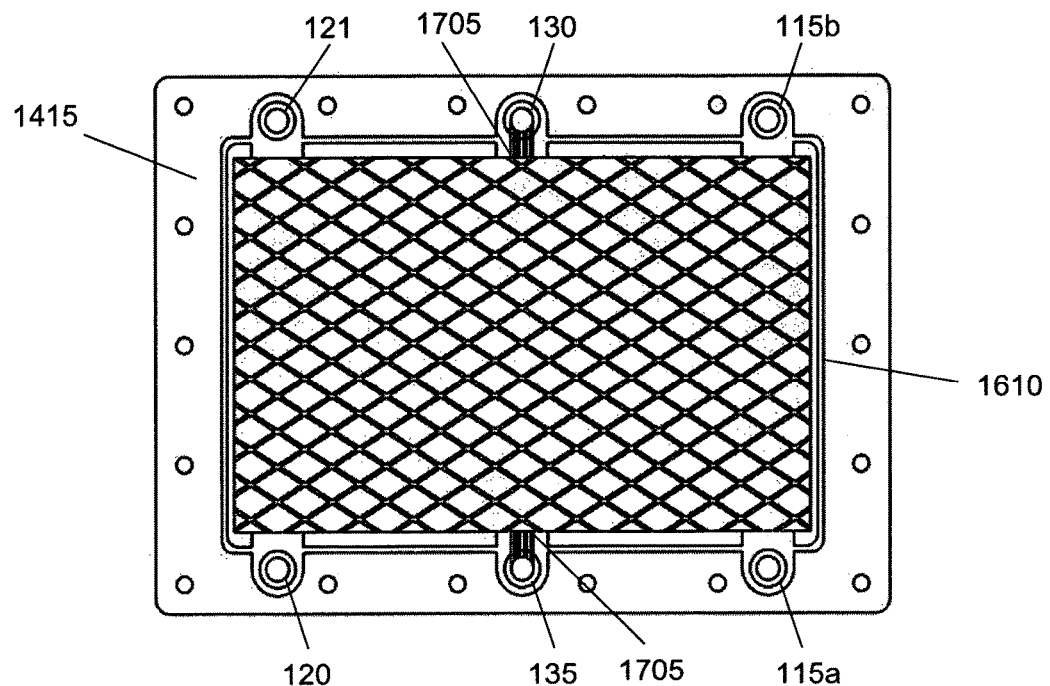
FIG. 17 illustrating a vacuum plate of the membrane module assembly in accordance with an embodiment of this invention.

A first side of first vacuum plate 1415 mates with a second side of the first cold plate 1410. A first condensation sheet 110 is positioned between these two plates. The connections of first vacuum plate 1415 are shown in FIG. 17. Similarly with first cold plate 1410, silicon gasket 1610 encases the inner portion of first vacuum plate 1415 forming a seal around the inner portion of first vacuum plate 1415. In operation, the non-condensable gases are extracted out through extraction outlet 130 and the condensate is collected through collection outlet 135. Silicon pipes 1705 provide means for the gases and condensate to be conveyed to the respective outlets.

Figure 18:
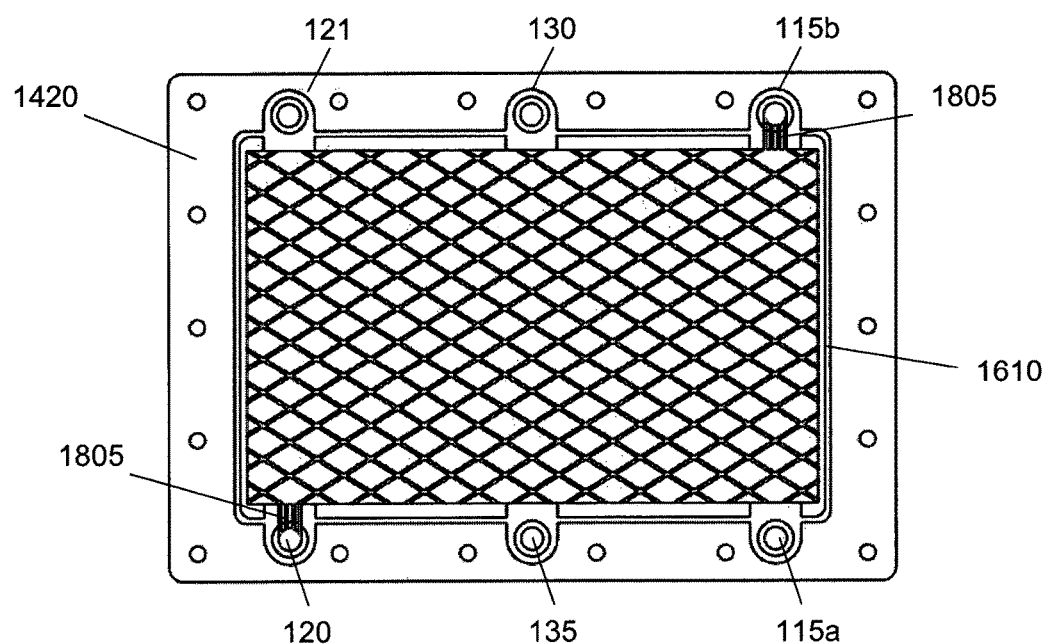
FIG. 18 illustrating a hot plate of the membrane module assembly in accordance with an embodiment of this invention.

A first side of a hot plate 1420 mates with a second side of first vacuum plate 1415. A first distillation membrane 105 is positioned between these two plates. The connections of hot plate 1420 are shown in FIG. 18. Similarly with first cold plate 1410 and first vacuum plate 1415, silicon gasket 1610 encases the inner portion of hot plate 1420, forming a seal around the inner portion of hot plate 1420. Silicon pipes 1805 provide means for the warmer flow solution 120 and warmer feed solution 115*b* to be in fluid communication with the inner portion of hot plate 1420. It should be noted that a first condensation chamber 140 is formed between first distillation membrane 105 and first condensation sheet 110 in this current assembly.

Figure 19:
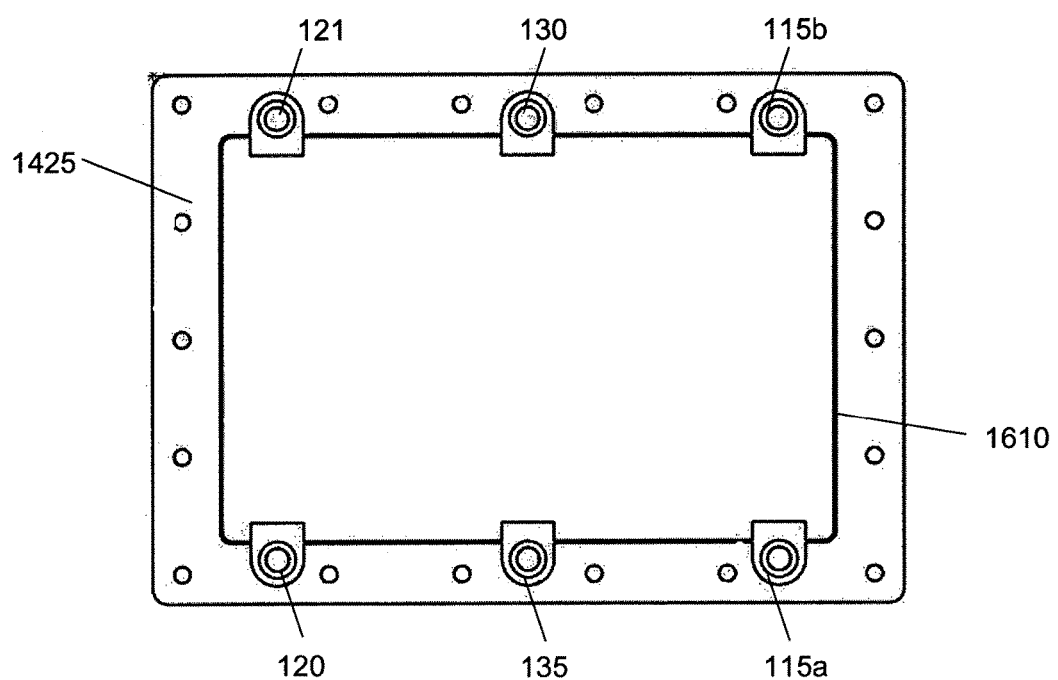
FIG. 19 illustrating a second end plate of the membrane module assembly in accordance with an embodiment of this invention.

A second side of hot plate 1420 mates with a first side of second vacuum plate 1415. A second distillation membrane 105 is positioned between these two plates. A second side of second vacuum plate 1415 mates with a first side of second cold plate 1410. A second condensation sheet 110 is positioned between these two plates. A second condensation chamber is formed between the second condensation sheet 110 and the second distillation membrane 105. A first side of the second end part 1425 mates with the second side of second cold plate 1410. The connections of second end part 1425 is shown in FIG. 19. Silicon gasket 1610 encases the inner portion of second end part 1425 forming a seal around the inner portion. One skilled in the art will recognize that membrane module assembly 1400 may be cascaded to increase the volume of water that may be distilled.

Furthermore, in other embodiments of the invention, the VAGMD system may be used to increase the concentration of salt and/or non-volatile components within a volatile solution when the flow solution is replaced with the volatile solution. The evaporation of water vapour from the volatile solution causes the concentration of non-evaporable content within the volatile solution to increase. This results in a flow solution with an increased amount of non-evaporable material. The concentrated flow solution may then be separated and collected for further use.

The above is a description of a Vacuum Air Gap Membrane Distillation (VAGMD) system whereby a partial vacuum is formed within its condensation chamber and non condensable gases within this condensation chamber are extracted in order to improve the flux rate of the system. Additionally, the VAGMD system utilizes a temperature and vapour pressure gradient across the distillation membrane to achieve a high flux rate. It is foreseen that those skilled in the art can and will design alternative embodiments of this invention as set forth in the following claims.

The invention claimed is:

1. A desalination system comprising:
   a first condensation sheet having a feed side and a distillate side wherein a feed solution is in fluid communication with the feed side of the first condensation sheet;
   a heat exchanger configured to heat the feed solution after the feed solution has contacted the feed side of the first condensation sheet;
   a first distillation membrane at a specified distance from the distillate side of the first condensation sheet having a distilland side and a distillate side wherein heated feed solution from the heat exchanger is in fluid communication with the distilland side of the first distillation membrane;
   a first condensation chamber formed between the distillate side of the first distillation membrane and the distillate side of the first condensation sheet, having a first collection outlet and a first extraction outlet spaced apart from one another, and
   a vacuum generator in communication with the first collection outlet and the first extraction outlet.

2. The desalination system of claim 1 wherein the first collection outlet and the first extraction outlet are supplied with a negative pressure by the vacuum generator causing the first condensation chamber to have a partial vacuum.

3. The desalination system of claim 2 further comprising:
   a collector that is in communication with the first collection outlet wherein condensed fluids formed at the distillate side of the first condensation sheet are collected by the collection means when the negative pressure is supplied to the first collection outlet; and
   wherein latent heat from the heated feed solution are transferred to the feed solution when the condensed fluids form at the distillate side of the first condensation sheet.

4. The desalination system of claim 3 wherein the collector comprises:
   a pump; and
   a thermo-compressor.

5. The desalination system of claim 2 further comprising:
   an extractor that is in communication with the first extraction outlet wherein non-condensable gases within the first condensation chamber are extracted by the extraction means when the negative pressure is supplied to the first extraction outlet.

6. The desalination system of claim 4 wherein the extractor comprises:
a pump; and
a thermo-compressor.

7. The desalination system of claim 1 wherein the vacuum generator comprises:
a pump; and
a thermo compressor.

8. The desalination system of claim 1 wherein the first extraction outlet and the first collection outlet are remote from one another at opposing ends of the condensation chamber.

9. The desalination system of claim 1 wherein the specified distance between the first condensation sheet and the distillate side of the first distillation membrane is between 2 mm and 4 mm.

10. The desalination system of claim 1 wherein the first distillation membrane comprises a triple layer composite nanofiber membrane.

11. The desalination system of claim 10 wherein a distilland side of the triple layer composite nanofiber of the first distillation membrane comprises a hydrophobic electrospun nanofiber layer, and the distillate side of the triple layer composite nanofiber membrane comprises a hydrophilic backing layer.

12. The desalination system of claim 2 wherein the vacuum generator is configured to maintain the first condensation chamber at a pressure that is lower than the vapour pressure of a flow solution.

13. A desalination system of claim 1 further comprising:
a second distillation membrane further comprising a distilland side and a distillate side wherein the distilland side of the second distillation membrane is in fluid communication with the heated feed solution, and wherein the distilland side of the second distillation membrane faces the distilland side of the first distillation membrane;
a second condensation sheet at a specified distance from the distillate side of the second distillation membrane having a feed side and a distillate side wherein the distillate side of the second condensation sheet faces the distillate side of the second distillation membrane, and wherein the feed side of the second condensation sheet is in fluid communication with the feed solution;
a second condensation chamber formed between the distillate side of the second distillation membrane and the distillate side of the second condensation sheet, having a second collection outlet and a second extraction where the first collection outlet and the second collection outlet, and
where the vacuum generator is in communication with the second collection outlet and the second extraction outlet.

14. The desalination system of claim 13 wherein the vacuum generator is configured to supply a negative pressure to the first and second collection outlets and the first and second extraction outlets causing the first and second condensation chambers to have a partial vacuum.

15. The desalination system of claim 14 further comprising:
a collector that is in communication with the first and second collection outlets wherein, condensed fluids formed at the distillate side of the first and second condensation sheets are collected by the collector when the negative pressure is supplied to the first and second collection outlets; and
wherein latent heat from a flow solution are transferred to the feed solution when the condensed fluids form at the distillate side of the first and second condensation sheets.

16. The desalination system of claim 15 wherein the collector comprises:
a pump; and
a thermo-compressor.

17. The desalination system of claim 14 further comprising:
an extractor that is in communication with the first and second extraction outlets wherein, non condensable gases within the first and second condensation chambers are extracted by the extractor when the negative pressure is supplied to the first and second extraction outlets.

18. The desalination system of claim 17 wherein the extractor comprises:
a pump; and
a thermo-compressor.

19. The desalination system of claim 13 wherein the first extraction outlet and the first collection outlet are located at opposing ends of the condensation chamber.

20. The desalination system of claim 13 wherein the vacuum generating means comprises:
a pump; and
a thermo compressor.

21. The desalination system of claim 20 wherein the thermo compressor further comprises an injector.

22. The desalination system of claim 13 wherein,
the specified distance between the first condensation sheet and the distillate side of the first distillation membrane; and
the specified distance between the second condensation sheet and the distillate side of the second distillation membrane are between 2 mm and 4 mm.

23. The desalination system of claim 22 wherein the first and second distillation membranes comprise triple layer composite nanofiber membranes.

24. The desalination system of claim 23 wherein the distilland side of the triple layer composite nanofiber membranes of the first and second distillation membranes each comprise a hydrophobic electrospun nanofiber layer, and the distillate side of the triple layer composite nanofiber membranes of the first and second distillation membranes each comprises a hydrophilic backing layer.

25. The desalination system of claim 13 wherein the first and second condensation chambers are configured to be maintained at a pressure that is lower than the vapour pressure of a flow solution.

26. A method for purifying liquids using a distillation system having a first distillation membrane with a distillate side and a distilland side, and a first condensation sheet with a distillate side and a feed side, the first condensation sheet being located at a specified distance from the first distillation membrane in which the distillate side of the first distillation membrane faces the distillate side of the condensation sheet forming a first condensation chamber, the first condensation chamber having a first collection outlet and a first extraction outlet, the method comprising the steps of:
applying negative pressure to the first condensation chamber through the first collection outlet and the first extraction outlet through a vacuum generator;

flowing a feed solution along the feed side of the first condensation sheet;

heating, using a heat exchanger, the feed solution after the feed solution has contacted the feed side of the first condensation sheet and directing the heated feed solution to the distilland side of the first distillation membrane;

flowing the heated feed solution along the distilland side of the first distillation membrane;

transferring latent heat from the heated feed solution to the feed solution when water vapour from the-heated feed solution condenses on the distillate side of the first condensation sheet;

collecting condensate formed on the distillate side of the first condensation sheet through the first collection outlet; and extracting non condensable gases formed within the first condensation chamber through the first extraction outlet.

27. The method of claim 26 wherein the step of applying a negative pressure comprises:

generating the negative pressure by pumping a liquid with a pump; and directing the pumped liquid through a thermo-compressor.

28. The method of claim 26 wherein the step of collecting condensate comprises:

generating a negative pressure using a pump and a thermo-compressor;

applying the negative pressure to the first collection outlet; and collecting the condensate flowing through the first collection outlet.

29. The method of claim 26 wherein the step of extracting the non condensable gases comprises:

generating a negative pressure using a pump and a thermo-compressor;

applying the negative pressure to the first extraction outlet;

extracting non condensable gas molecules from pores within the first distillation membrane; and discharging the non condensable gases extracted through the first extraction outlet.

* * * * *